June 1, 1965 A. N. KONSTANT ET AL 3,186,527
STRUCTURAL LOCK
Filed March 7, 1963 2 Sheets-Sheet 1
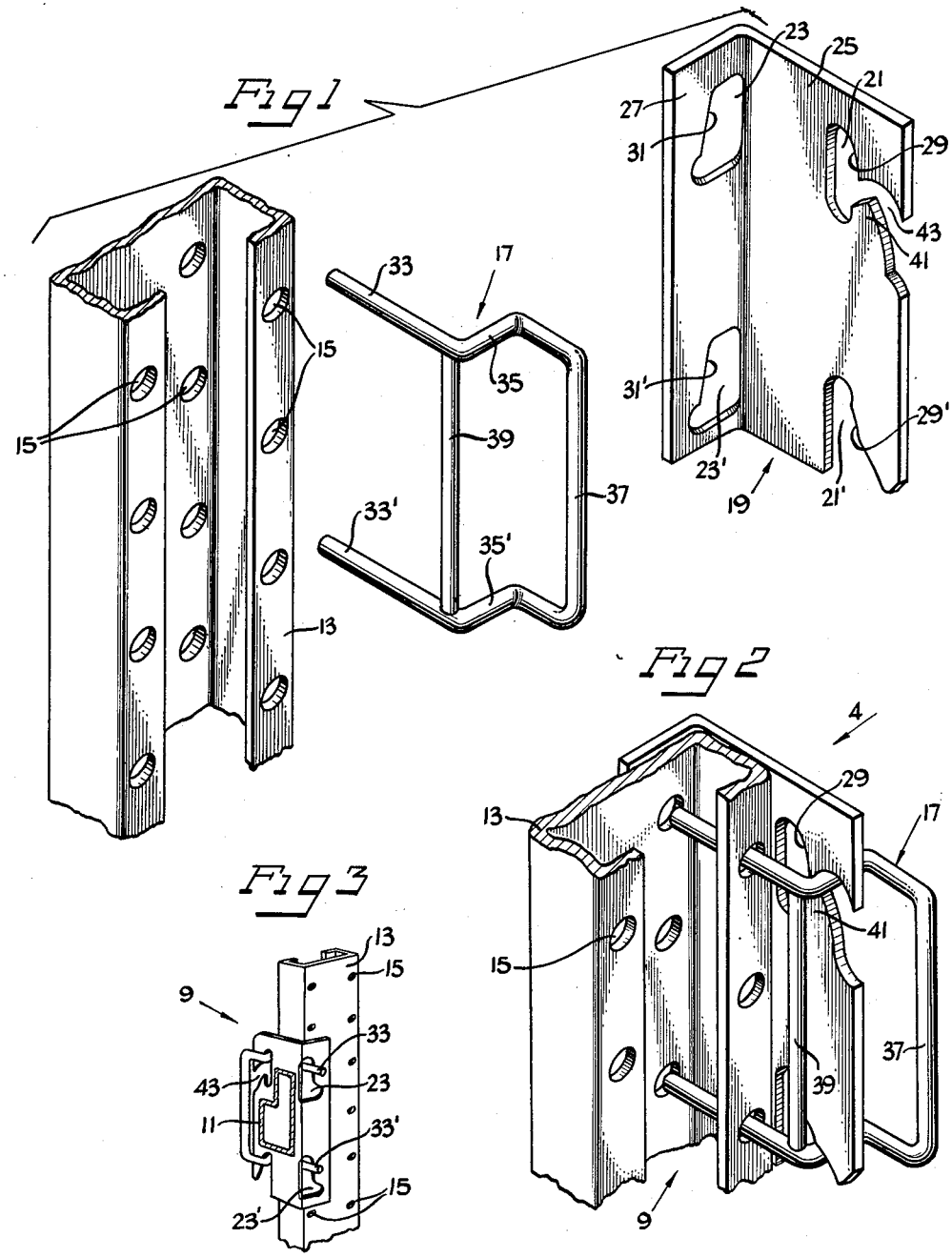
INVENTORS
Anthony N. Konstant
Burt E. Schell, Jr.
BY
Anderson, Luedeka, Fitch,
Even & Tabin
ATTY's June 1, 1965  A. N. KONSTANT ET AL  3,186,527
STRUCTURAL LOCK
Filed March 7, 1963  2 Sheets-Sheet 2
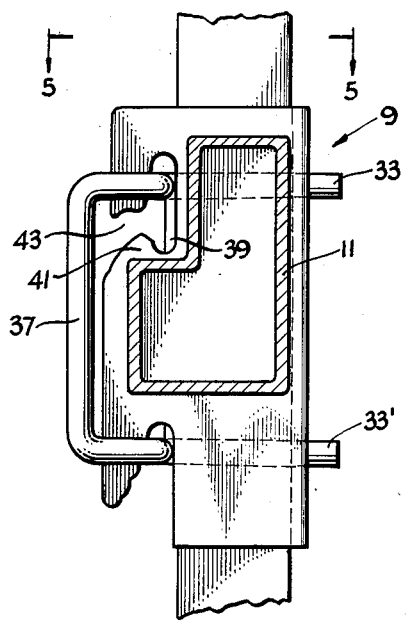
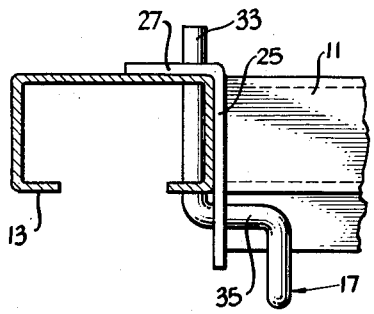
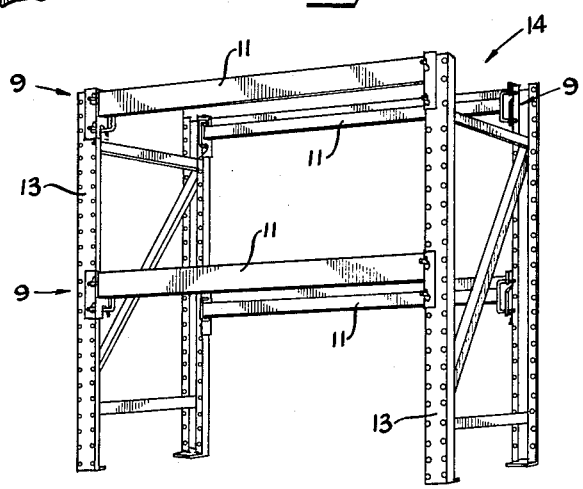
INVENTORS
Anthony N. Konstant
Burt E. Schell, Jr.

United States Patent Office 3,186,527
Patented June 1, 1965

3,186,527
STRUCTURAL LOCK
Anthony N. Konstant, Mount Prospect, and Burt E. Schell, Jr., Long Grove, Ill., assignors to Speedrack Inc., Skokie, Ill., a corporation of Illinois
Filed Mar. 7, 1963, Ser. No. 263,509
5 Claims. (Cl. 189—35)

This invention relates to a device for connecting the structural members of a storage rack or the like and, more particularly to a safety lock preventing inadvertent separation of the connection.

The United States Patent to Schell, No. 2,932,368, issued April 12, 1960, illustrates one form of a very satisfactory arrangement for detachably connecting structural members. This structural lock utilizes pin and slot connections perpendicularly disposed to each other and has proved effective in achieving an extremely firm connection between structural members, which connection can be quickly made and readily released. As such, the lock has found ready application in the storage field. However, along with this readiness for disassembly, lies the inherent possibility of accidental separation.

The lock, which is illustrated in the above patent for use in a storage tack to join a vertical structural member with a horizontal structural member, provides a connection the firmness of which increases as downward pressure upon the horizontal member is increased. The lock construction also permits separation of the structural members to be easily accomplished by merely exerting upward pressure on the horizontal beam. The weight of the horizontal beam itself, even when unloaded, is normally sufficient to maintain a firm connection. However in a few cases, due to rough handling, it is possible for an inadvertent upward blow or the rebound reaction to a sharp downward blow, e.g. the dropping of a loaded pallet, to disengage the lock.

A principal object of the present invention is to provide an improved locking arrangement for connecting structural members used in storage racks or the like. Another object of the present invention is to provide in such a structure a novel safety locking arrangement which will prevent accidental separation from occurring as the result of unintentional or inadvertent forces.

Other objects and advantages of the invention will become apparent by reference to the following detailed description and accompanying drawings wherein:

FIGURE 1 is an exploded fragmentary view of a vertical column, a connecting pin and a locking angle plate which comprise a structural lock embodying various of the features of the invention;

FIGURE 2 is an assembled fragmentary perspective view showing the elements pictured in FIGURE 1 in the intermediate locking position;

FIGURE 3 is a fragmentary perspective view, reduced in size, showing the lock in the fully locked position;

FIGURE 4 is a fragmentary elevational view shown looking in the direction of the arrow 4 of FIGURE 2;

FIGURE 5 is a plan view taken along the line 5—5 of FIGURE 4; and

FIGURE 6 is a perspective view of an assembled storage rack employing the improved structural locks.

The improved structural lock 9 shown in the drawings provides a means for securing the joinder of structural members used in a metal framework by interconnecting them with pin and slot connections. One application to which the invention is especially adaptable is illustrated in FIGURE 6; here the locks 9 are used to interconnect horizontal members or beams 11 and posts or columns 13 to form a storage rack 14. The columns 13, preferably of bar or channel shape in cross section, contain aligned apertures 15 suitable for releasably holding connecting pins 17. The beams 11 have attached angle plates 19 at each end. Each angle plate 19 has a pair of vertical flanges or legs disposed at right angles to each other, and each of said flanges has a pair of vertically aligned slots at the same level as the slots in the other flange.

The beam 11 illustrated is an L-shaped box girder, but it should be understood that any suitable shape of beam may be used. The angle plates 19 may be fixedly attached to the ends of the beam in any suitable manner, such as by welding. One flange or leg section 25 has open slots 21, 21', and the flange or leg section 27, which is at right angles to the first leg section 25 has closed slots 23, 23'.

Camming edges 29, 29' and 31, 31', which are formed as parts of the open and closed slots respectively, provide the means by which a firm joinder of the beam 11 and the column 13 is accomplished. The camming edges 29, 31 are positioned so that as the beam 11 moves downward, the edges slide along the pin 17 producing forces in two directions which pull the angle plate 19 tightly against the column 13.

The pin 17 basically comprises an L-shaped pin section for engaging the slots 21 and 23 and means for securing the section against rotation. As best seen in FIGURE 1, the pin 17 includes a first pin section 33 which connects to a second pin section 35, the sections 33, 35 being generally perpendicular to each other. In order to prevent rotation of the pin sections 33, 35, a similar set of pin sections 33', 35' are provided. A U-shaped section 37 connects the two sets, and a spacing member 39 is provided for reinforcing purposes. The pin sections 33, 35 co-act with the slots 23, 21, respectively, to firmly interconnect the beam 11 and the column 13.

The safety locking feature of the improved structural lock 9 is provided by the particular formation of the open slot 21. A hump 41 is provided in the first leg 25 of the plate 19 to obstruct the entrance portion of the open slot 21. The hump 41 is so positioned that it alters the entrance portion of the open slot 21 to create a downwardly facing generally C-shaped passageway 43. The pin section 35 must pass through this passageway 43 before it can reach the camming edge 29. Because of the particular formation of the passageway 43, in order to disassemble the lock 9 from its locked position (FIG. 3), the beam 11 must first be raised so that the pin section 35 is disengaged from the camming edge 29. Then, the beam 11 must be moved with a diagonally downward motion so that the pin section 35 enters the passageway and moves to the intermediate position, shown in FIG. 2. From this position, the beam 11 must be moved diagonally upward so that the pin section 35 traverses the front half of the curving passageway 43 and exits from the slot 21.

Because of the number of moves necessary to effect it, it is highly unlikely that inadvertent action will disconnect the two members, although this disconnection can easily be made by hand. Thus, the provision of the hump 41 creates a safety feature that guards against accidental disengagement without sacrificing ease in assembly and disassembly of the lock.

In erecting a storage rack 14, illustrated in FIGURE 6, a pin 17 is first inserted into a pair of holes 15 in the column 13 so that the pin sections 33, 33', protrude therefrom. The beam 11 is brought in from the outside into abutting relation with the column 13 so that the pin sections 33, 33' extend through the closed slots 23, 23' and the pin sections 35, 35' enter the open slots 21, 21'. The beam 11 is then moved diagonally downward until pin section 35 reaches the top of the passageway 43 (intermediate position). From this position, the beam is moved diagonally upward until pin section 35 leaves the other end of the passageway 43 and enters the main vertical area of the slot 21, below the camming edge 29. Finally, the beam is moved downward and the camming edges 29, 31 of the slot engage the connecting pin 17 and pull the angle member 19 into a close fit and locking position with the column 13.

Furthermore, the provision of the intermediate locking position facilitates the assembly of a complete structure such as the storage rack 14 shown in FIG. 6. During the erection of such a structure, all of the beam 11 are first loosely linked to their respective columns 13 by connecting the locks 9 in the intermediate locking positions. Then, when all these connections have been made, the locks 9 are one by one moved to their final tightened positions. In this way, it is easier to install the last beam, for although the partially erected structure is self-supporting, it is not so solid that it is difficult to manipulate the final locks into place.

Various of the features of the invention are set forth in the following claims.

What is claimed is:

1. A structural unit which comprises an L-shaped locking pin having first and second pin sections disposed in generally perpendicular relation to each other, a first structural member including means releasably engaging said first pin section, a second structural member with a facing surface having two portions disposed in generally perpendicular relation to each other and in abutting engagement with said first member, one of said portions including means in releasable engagement with said first pin section and the other of said portions including retaining means in releasable engagement with said second pin section and also including means obstructing the exit of said second pin section from said retaining means so as to prevent the unintentional disengagement of said structural members, and means preventing rotation of said locking pin relative to said members.

2. A structural unit which comprises an L-shaped locking pin having first and second pin sections disposed in generally perpendicular relation to each other, a first structural member including means releasably engaging said first pin section, a second structural member with a facing surface having two portions disposed in generally perpendicular relation to each other and in abutting engagement with said first member, one of said portions having a cam-forming edge surface in releasable engagement with said first pin section and the other of said portions having a cam-forming edge surface in releasable engagement with said second pin section and having a passageway therein through which said second pin section must move to reach said cam-forming edge, means obstructing said passageway to prevent outward bodily movement of said second structural member relative to said second pin section, and means preventing rotation of said locking pin relative to said members.

3. A structural unit which comprises an L-shaped locking pin having first and second pin sections disposed in generally perpendicular relation to each other, a first structural member including means releasably engaging said first pin section, a second structural member with a facing surface having two portions disposed in generally perpendicular relation to each other and in abutting engagement with said first member, one of said portions having a cam-forming edge surface in releaseable engagement with said first pin section and the other of said portions having a generally vertically extending slot formed therein one edge surface of which slot releasably engages said second pin section in camming relation and also having a curved access passageway communicating with said slot, which passageway prevents inadvertent disengagement of said structural members by obstructing the exit of said second pin section from said slot, and means preventing rotation of said locking pin relative to said members.

4. A structural unit which comprises an L-shaped locking pin having first and second pin sections disposed in generally perpendicular relation to each other, a first structural member including means releasably engaging said first pin section, a second structural member with a facing surface having two portions disposed in generally perpendicular relation to each other and in abutting engagement with said first member, one of said portions having a cam-forming edge surface in releasable engagement with said first pin section and the other of said portions having a generally vertically extending slot formed therein, one edge surface of which slot releasably engages said second pin section in camming relation and also having an access passageway communicating with said slot which passageway thereby prevents inadvertent disengagement of said structural members by obstructing the exit of said second pin section from said slot and curves downwardly from a central point therein, and means preventing rotation of said locking pin relative to said members.

5. In a structural unit having a connection including an L-shaped locking pin having first and second pin sections disposed in generally perpendicular relation to each other, a first structural member including means releasably engaging said first pin section, a second structural member with a facing surface having two portions disposed in generally perpendicular relation to each other and in abutting engagement with said first member, one of said portions having a cam-forming edge surface in releasable engagement with said first pin section and the other of said portions having a cam-forming edge surface in releasable engagement with said second pin section and having a passageway therein through which said second pin section must move to reach said cam-forming edge, and means preventing rotation of said locking pin relative to said members, the improvement which comprises means obstructing said passageway to prevent outward bodily movement of said second structural member relative to said second pin section.

References Cited by the Examiner
UNITED STATES PATENTS

| | | | |
|---|---|---|---|
| 2,932,368 | 4/60 | Schell | 189—35 X |
| 3,096,108 | 7/64 | Baybarz | 189—36 X |

HARRISON R. MOSELEY, *Primary Examiner.*